(12) United States Patent
Meir (10) Patent No.: US 7,558,272 B2
(45) Date of Patent: Jul. 7, 2009

(54) METHOD AND SYSTEM FOR A TWO LEVEL SCALABLE BUNDLING SOLUTION

(75) Inventor: Eli Meir, Matan (IL)

(73) Assignee: Megabridge Ltd., Tel Aviv (IL)

( * ) Notice: Subject to any disclaimer, the term of this patent is extended or adjusted under 35 U.S.C. 154(b) by 777 days.

(21) Appl. No.: 11/157,936

(22) Filed: Jun. 22, 2005

(65) Prior Publication Data

US 2006/0291476 A1 Dec. 28, 2006

(51) Int. Cl.
*H04L 12/56* (2006.01)
(52) U.S. Cl. .................. 370/395.43; 370/395.42; 370/395.6; 370/395.61; 370/395.65
(58) Field of Classification Search .......... 370/229, 370/230, 231, 235, 395.1, 395.43, 395.61, 370/395.64, 395.65, 445, 395.6, 395.4, 395.41, 370/395.42, 395.5, 493, 230.1
See application file for complete search history.

(56) References Cited

U.S. PATENT DOCUMENTS

| | | | | |
|---|---|---|---|---|
| 5,883,819 | A * | 3/1999 | Abu-Amara et al. | 716/1 |
| 6,449,252 | B1 * | 9/2002 | Marsteiner | 370/230 |
| 6,654,376 | B1 * | 11/2003 | Stacey et al. | 370/395.21 |
| 6,834,053 | B1 * | 12/2004 | Stacey et al. | 370/395.4 |
| 7,068,657 | B2 * | 6/2006 | Keller-Tuberg | 370/394 |
| 7,068,665 | B2 * | 6/2006 | Lee | 370/395.6 |
| 7,158,523 | B2 * | 1/2007 | Jacobson et al. | 370/395.1 |
| 7,161,953 | B2 * | 1/2007 | Shenoi | 370/465 |
| 7,266,122 | B1 * | 9/2007 | Hogg et al. | 370/395.41 |
| 7,289,508 | B1 * | 10/2007 | Greene | 370/394 |
| 7,406,042 | B1 * | 7/2008 | Shridhar et al. | 370/230 |

\* cited by examiner

*Primary Examiner*—Wing F. Chan
*Assistant Examiner*—Mark A. Mais
(74) *Attorney, Agent, or Firm*—Fleit Gibbons Gutman Bongini & Bianco PL; Paul D. Bianco; Martin Fleit (57) ABSTRACT

The present invention is a system and a method which enables implementing a scalable, carrier class bundling multiplexed data communication on low rate links. The proposed system and method, which comply with the data transference specifications of both CBR and statistical traffic, offer a data bundling solution with minimal overhead that may operate on different types of connections, using links with diverse capacities. The disclosed bundling mechanism is based on a two level mechanism: the lower level is composed of any number of superlinks, each gathering 8 communication links. The upper level is composed of two bundlers—for CBR data and for statistical traffic—each connected to all the superlinks. The header of each dataframe includes all the required information. This guarantees that the receiving side has full status information for all the links suffice that only one link is received without a CRC error.

14 Claims, 9 Drawing Sheets

METHOD AND SYSTEM FOR A TWO LEVEL SCALABLE BUNDLING SOLUTION

FIELD OF THE INVENTION

The present invention relates in general to systems and methods of data communication, and more particularly it relates to multiplex data communication. Specifically the invention relates to systems and methods for a scalable, carrier class bundling multiplexed data communication to be implemented on low rate links.

BACKGROUND

The bundling communication method allows making use of a plurality of communication links simultaneously for the purpose of improving data transference rates. In order to be efficient, cost effective and reliable, the bundling mechanism should fill certain requirements. First, it needs to support both constant bit rate (CBR) services (e.g. voice traffic over time division multiplexing (TDM) channels, Video streams) and statistical traffic which includes data frames. The end-to-end delay should be as low as possible: less then 5 ms for CBR traffic, and less then 10 ms for statistical traffic. In addition, the end-to-end jitter should be as low as possible, especially for the CBR whose jitter should amount to practically zero. Static traffic may endure up to 10 ms of jitter. The sequential order of the traffic is also very important; traffic generated on the far side needs to be in keeping with the received order.

The bundling mechanism should also be scalable. It should support bundling using varying numbers of links, from as little as 8 links and up to 128 links. The bundling cost should be proportional to the number of used links. Furthermore, the bundling mechanism should operate using links with different bit rates simultaneously (from 256 kbit/s and up to 8 mbit/s); the bundled links may be symmetrical or asymmetrical.

The bundling mechanism should support bit error rate (BER) measurements and reports, in order to enable redirection of the transmitted traffic over the bundled links according to the receive side BER (per link), within 50 ms. Whenever the BER of one of the links crosses a predefined threshold, it is removed from the bundle within 50 ms. The link is added back to the bundle once its BER drops back beneath the threshold. The switching of a link should be performed without affecting the traffic.

Finally, the bundling mechanism should support independent transmission and reception paths, in order to ensure that at any given moment, links only in use in one direction.

Known in the art are several methods for establishing a communication route using bundling methods. The Multi-Link Point to Point Protocol (MLPPP) is a method of splitting, recombining, and sequencing datagrams across multiple logical data links. Its mechanism which operates without fragmentation transmits each frame over a separate link. The main shortcoming of this method is that it causes high delay and high jitter. Using the same mechanism with fragmentation is not scalable. In addition, it is not equipped to handle CBR data.

The inverse multiplexing on ATM (IMA) is a physical layer technology, in which a high-speed stream of asynchronous transfer mode (ATM) cells is broken up and transmitted across multiple T1/E1 links, then it is reconstructed back into the original ATM cell order at the destination. It has similar shortcomings as the MLPPP mechanism. It has relatively high overhead costs, may only operate with multiple links which have the same bit rate, and it is not scalable.

There is therefore a need for a system and a method which could provide a scalable, carrier class bundling multiplexed data communication to be implemented on low rate links. The system and the method need to overcome the limitations of prior art while complying with the data transference specifications of both CBR and statistical traffic.

SUMMARY

The present invention discloses a communication system which provides scalable bundling for a plurality of communication links, supporting constant bit rate data and statistical/random data bit rate. The system is comprised of an upper TX bundling level, a lower TX bundling level, a lower RX bundling level and an upper RX bundling level. The upper TX bundling level includes a CBR bundler and a statistical traffic bundler for allocating bundled data based on received CBR and statistical data. The lower TX bundling level which includes several superlink units, receives the allocated bundled data, performs "on the fly" dynamic fragmentation for generating frames to be transmitted through multiple communication links. The lower RX bundling level includes at least one superlink unit which receives data frames from multiple communication links and reassembles the fragmented data into the bundled data, performing "on the fly" dynamic synchronization. The upper RX bundling level includes a CBR bundler and a statistical traffic bundler for reassembling the transmitted data from the bundled data.

Each TX lower level superlink unit includes a framing machine, a memory of TX buffer and at least eight link interfaces, wherein each link interface measures each communication channel link bit rate. Each RX lower level superlink unit includes an extraction machine, a memory of RX buffer and at least eight link interfaces. The TX upper level bundler units include a classifier, a queue prioritizer, a scheduler and at least two superlink buffers, wherein the classifier allocates frames from the prioritized queues to the superlink buffers. The RX upper level bundler units include an allocator, an indexed cyclic buffer, a scheduler and at least two superlink buffers.

The generated frames include a control box, a CBR channel Field, a statistical traffic channel, and a cyclic redundancy check (CRC), wherein the control box is identical for all communication links of the same superlink. The control box includes: a links activity field indicating active links, a sequence field for synchronizing between the frames, a CBR Descriptor Field and a Received CRC Status Field.

Also disclosed is a communication method which provides scalable bundling for a plurality of communication links supporting constant bit rate data and statistical/random data bit rate. The method comprises the following steps: allocating bundled data at an upper communication level based on received CBR and statistical data, generating frames from the allocated bundled data at the lower communication level to be transmitted through multiple communication links, receiving data frames from multiple communication links and reconstructing the bundled data frames by a lower RX communication level, and reassembling the transmitted CBR and statistical traffic data from the data bundles by an RX communication level.

The method further comprises the steps of measuring each communication channel link bit rate and allocating the statistical data between the channel links accordingly, synchronizing received frames in accordance with sequence field embedded within each frame's control box, managing priority queues for bundled data allocation, and allocating statistical data in accordance with priority using a short header with priority/port field and frame number prior to the transmission. The generated frames include a control box, a CBR channel Field, a statistical traffic channel, and a cyclic redundancy check (CRC). The control box, which is identical for all communication links of the same superlink, includes a links activity field indicating active links, a sequence field for synchronizing between the frames, a CBR Descriptor Field and a Received CRC Status Field.

BRIEF DESCRIPTION OF THE DRAWINGS

These and further features and advantages of the invention will become more clearly understood in the light of the ensuing description of a preferred embodiment thereof, given by way of example only, with reference to the accompanying drawings, wherein.

DETAILED DESCRIPTION OF THE PREFERRED EMBODIMENT

The present invention overcomes the above mentioned limitations and shortcomings of prior art and offers an innovative bundling method and system with minimal overhead which is scaleable and may operate on different types of connections, using links with diverse capacities. The disclosed bundling mechanism is based on a two level mechanism.

Figure 1:
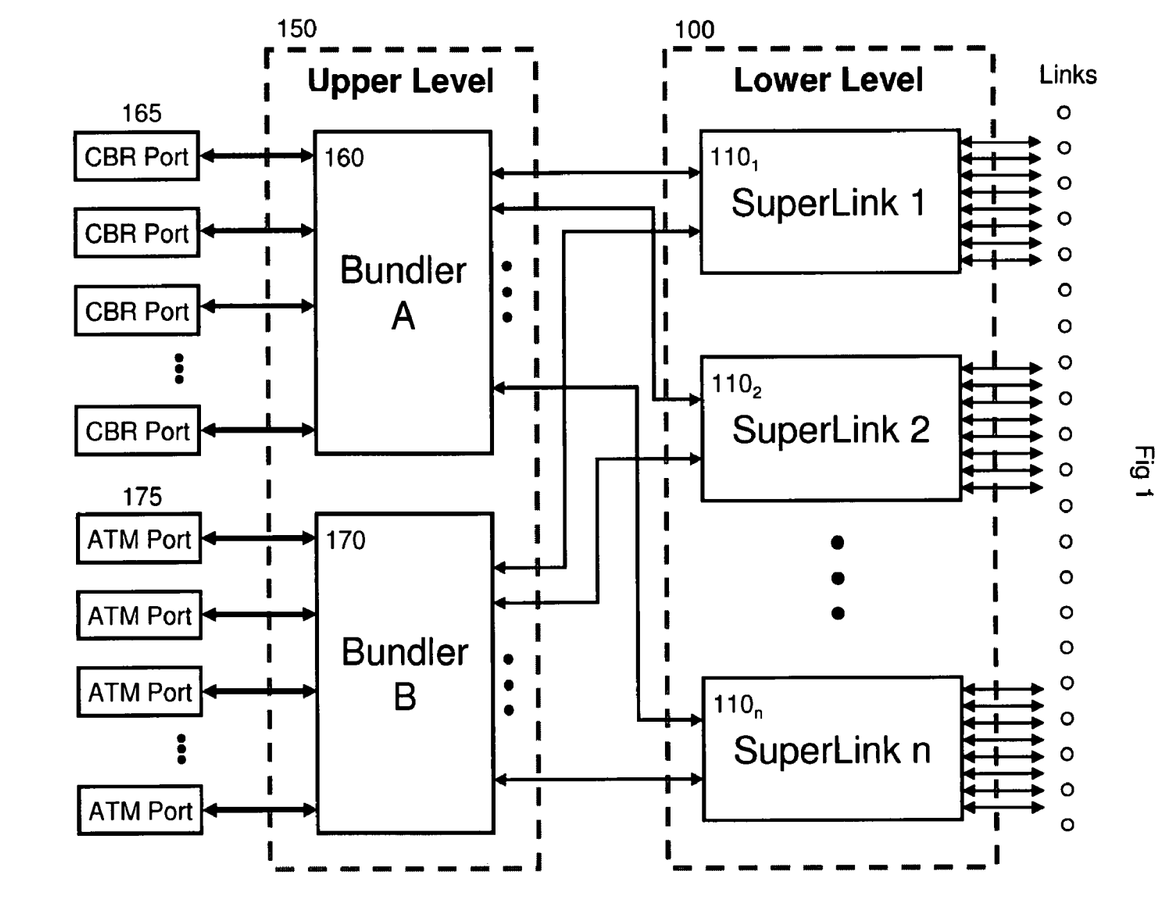
FIG. 1 is a block diagram illustrating the two levels of the bundling mechanism in accordance with the present invention.

FIG. 1, which is a block diagram of the bundling mechanism according to the present invention, portrays the two levels. Data ports 165, 175 are connected to the upper level 150 of the mechanism which includes two types of bundlers: Bundler A (160) which is a constant bit rates (CBR) bundler and Bundler B (170) which is a statistical traffic bundler. The data ports 165, 175 are divided according to their type of data: CBR data ports 165, which carry voice traffic over TDM channels and video streams for example, are connected to Bundler A (160) and statistical traffic ports 175, such as IP over Ethernet ports, are connected to Bundler B (170).

The lower level 100 includes a plurality of SuperLinks ($110_1$-$110_n$). Both Bundler A (160) and Bundler B (170) are connected to each of the SuperLinks ($110_1$-$110_n$), and each of the SuperLinks ($110_1$-$110_n$) is connected to a maximum of eight links. The number of SuperLinks on the lower level is therefore dependent on the overall number of links whereas the number of required SuperLinks is the number of links divided by eight.

In the lower level 100, a proprietary framer is used to achieve a bundled SuperLink ($110_1$-$110_n$), supports constant bit rate and statistical traffic channels, low delay, different bit rates per link, dynamic fragmentation, bit error rate (BER) measurement and report and independency of transmission (TX) and reception (RX) paths. This lower level framer is not scalable, and it bundles only up to eight links. This framer can operate over any constant bit rate links, such as asymmetric digital subscriber line (ADSL), symmetric digital subscriber line (SDSL), V.35 modems, radio links, etc.

The upper level mechanism achieves the scalability requirement by bundling a plurality of SuperLinks. This is a relatively simple and low cost mechanism, since it deals only with SuperLinks that have a minimal rate of 2 mbit/s, which eliminates the need to implement fragmentation to achieve low delay. The combination of the two levels enables a low cost scalable solutions.

The lower level framer generates frames with an average duration of 1 ms. The generated frames are in high level data link control (HDLC) format (FLAGs and zero insertion/deletion). The number of bytes within a frame depends on the link rate. The frame always has an integer number of bytes, but it may very every frame (the frame duration will be 1 ms±two bytes, with accurate average of 1 ms).

The timing of the transmitted 1 ms frames is derived from the bit rate of the CBR source (voice or video traffic). It is adjusted to enable regeneration of the same rate at the receiver side. Since the TX and RX paths are independent, this enables a plesiosynchronous operation.

Figure 2:
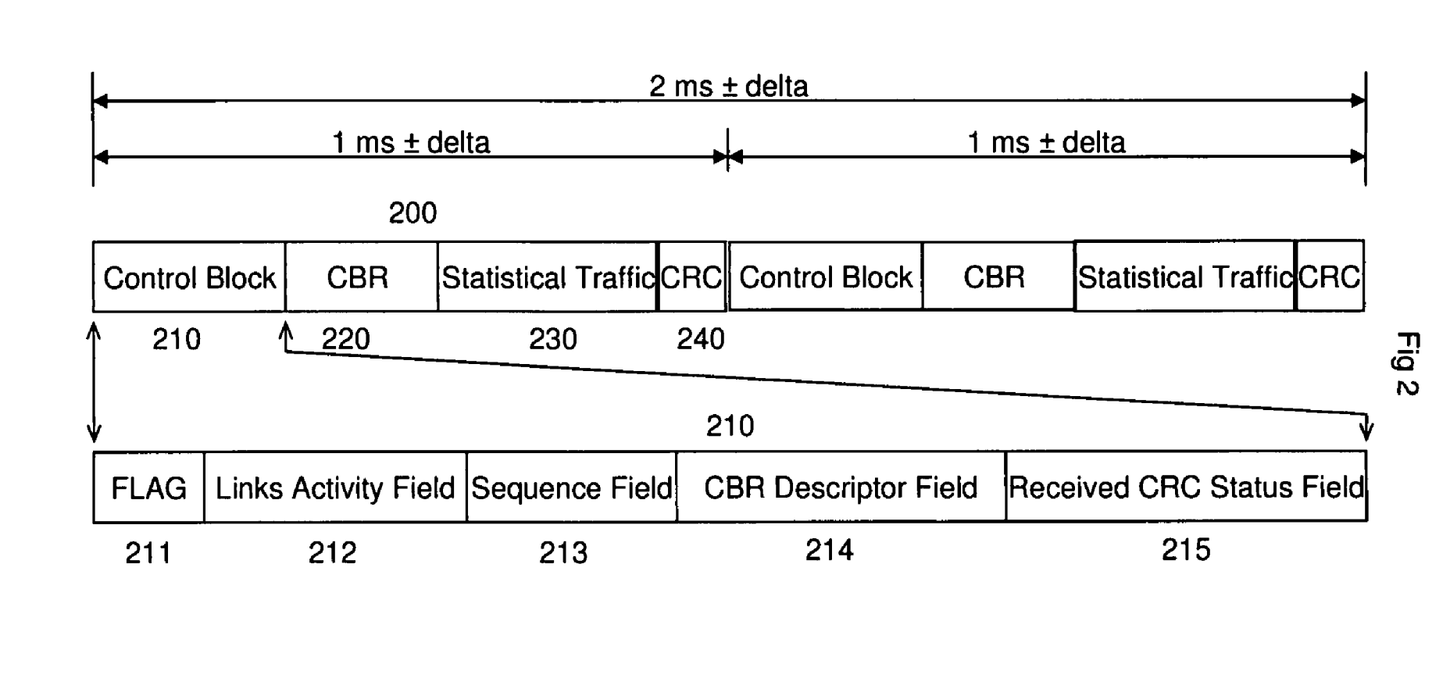
FIG. 2 is an illustration of the structure of the lower level frame in accordance with the present invention.

FIG. 2 is an illustration of the structure of the lower level frame. Each frame 200 is comprised of four segments: a control block 210, a CBR channel 220, a statistical traffic channel 230 and a cyclic redundancy check (CRC) 240. The Control Block 210 portion, which is identical for all links, includes all the required information for all links. This guarantees that the receiving side has full status information for all the links suffice that only one link is received without a CRC error.

If CBR data is not received, the CBR segment 220 is omitted. Control block 210 holds information regarding whether or not the CBR segment exists and data regarding its structure. Referring back to FIG. 2, a detailed structure of the control block 210 is illustrated. The control block 210 describes the structure of the current frame whereas the flag segment 211 indicates the beginning of the frame, the link activity field 212 states the active links for bundling in the current frame, the sequence field 213 is used to synchronize the reception from all links since links may have different delays and may be received in random order and not in the order of transmission. The CBR descriptor field 214 describes the structure of the CBR data in the current frame and the received CRC status field 215 holds the status of the last received frame CRC (of all links). Any Changes in the control frame immediately results in an appropriate response on the receiving side, without affecting the traffic.

Figure 3:
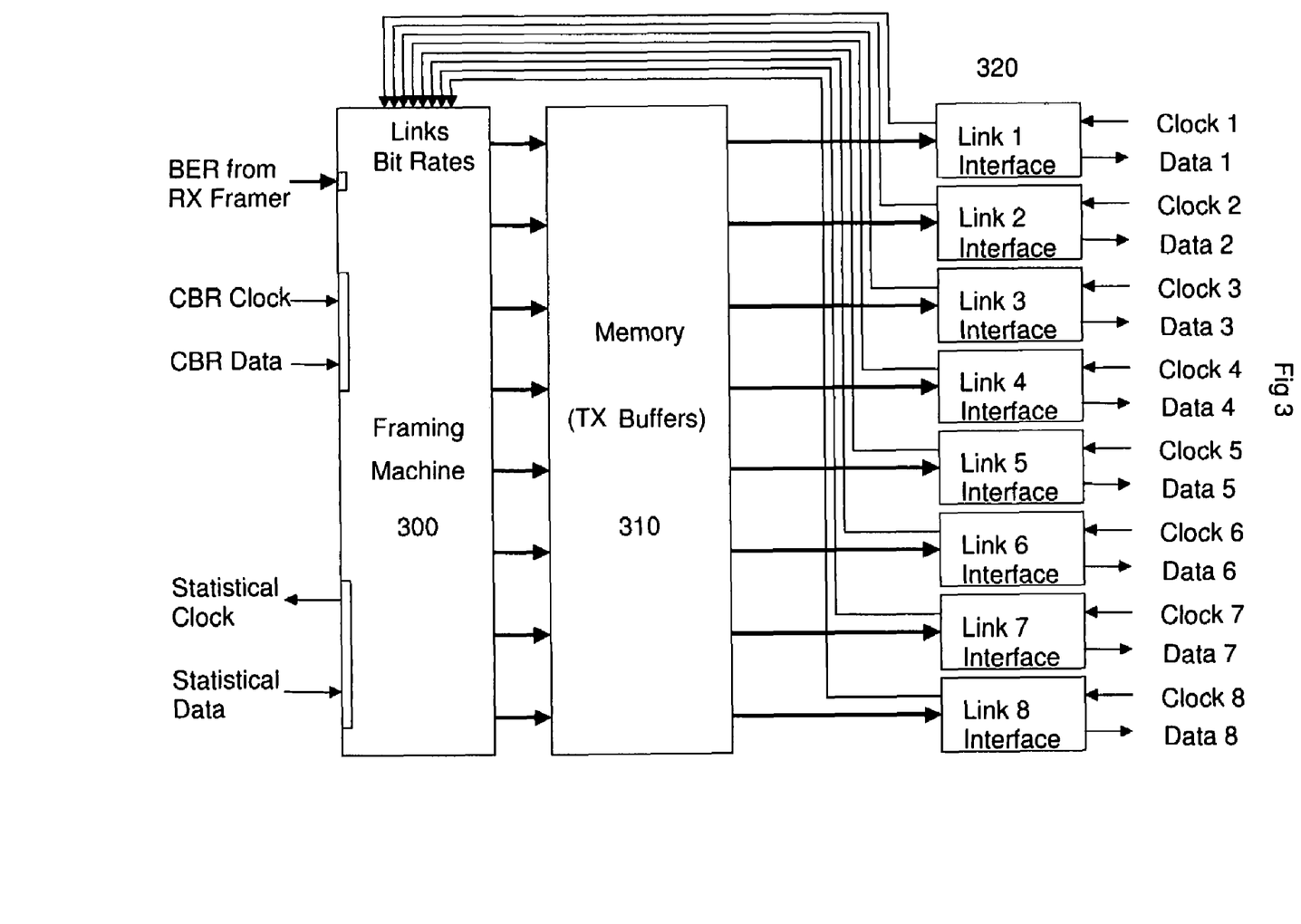
FIG. 3 is a block diagram of the lower level's TX framer in accordance with the present invention.

A block diagram of the TX framer, which makes use of a pipeline technique in order to perform "on the fly" dynamic fragmentation, is illustrated in FIG. 3. The framing machine 300 receives the bit rate of every channel as it is measured individually by the Link Interfaces 320. It then generates the frames sequentially, every 1 ms, according to the steps illustrated in the flowchart of FIG. 4. First, the sequence field is increased (step 400), the link pointer Ln is set to 1 (step 410) and the control block is written to the memory buffer Ln (step 420). Next, if according to the activity field, link Ln is not active (step 430) the frame is filled with null data (step 440), whereas the measured bit rate from the Link Interface Ln determines the frame length. If the link Ln is active the constant bit rate data is written to memory buffer Ln, according to the constant bit rate descriptor field (step 450). It is important to note that the value in this field may have null value if there is no constant bit rate data at all, and the rest of the frame is filled with data from the statistical traffic data (step 460). The measured bit rate from the Link Interface Ln determines the frame length in bytes (in the time domain, all frames have the same length of 1 ms in average).

Figure 4:
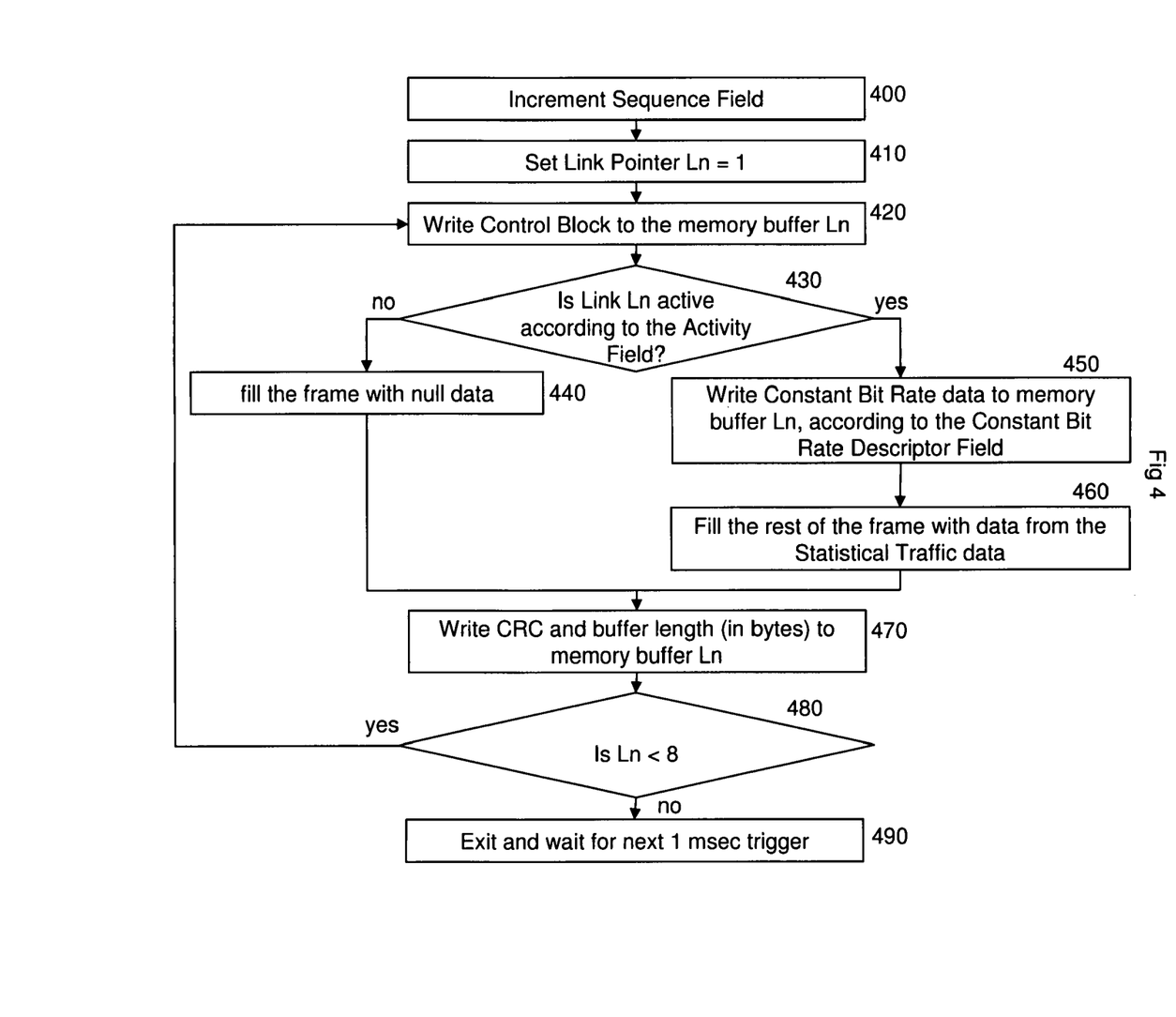
FIG. 4 is a flowchart of the operation of the framing machine of the lower level's TX framer.

In step 470 the CRC and buffer length (in bytes) are written to memory buffer Ln and if Ln is less then 8, Ln is incremented and the loop returns to step 430, otherwise the loop is exited until the next 1 ms trigger is given. In accordance with the pipeline mechanism, the frames stored in the TX buffers are transmitted to the links in the next 1 msec period.

Figure 5:
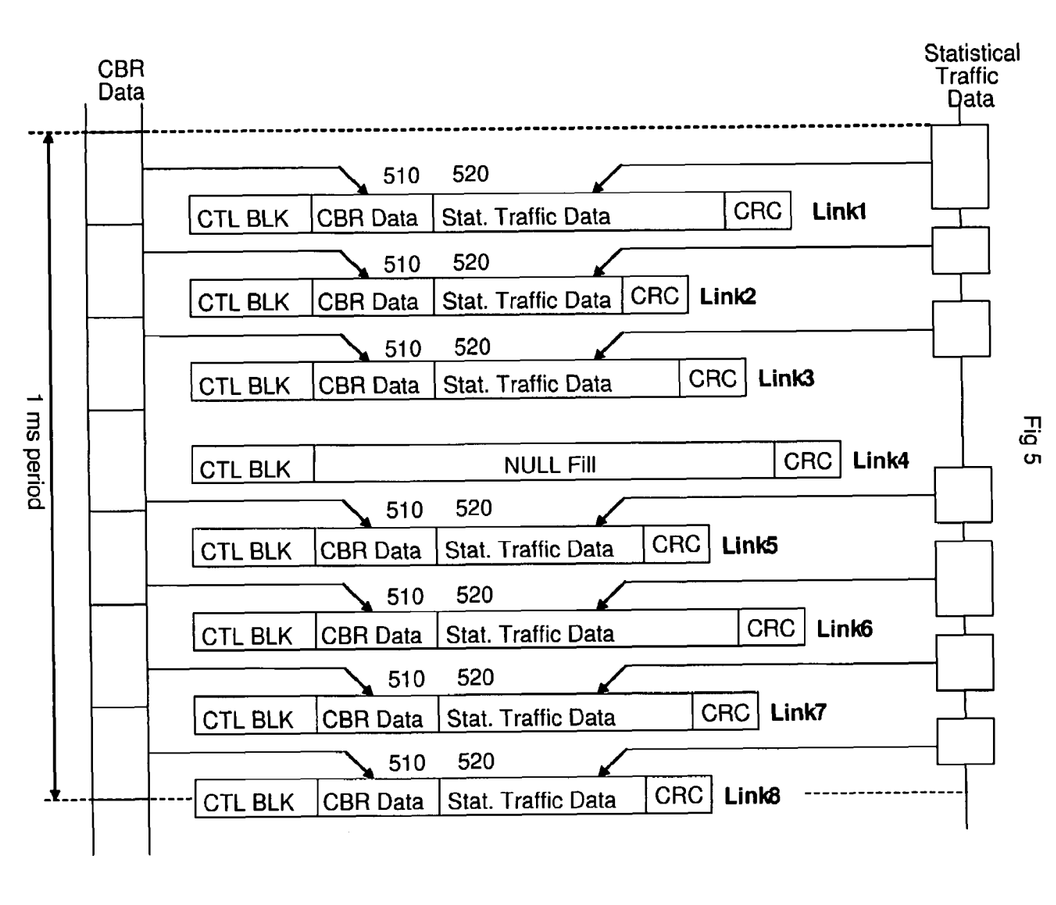
FIG. 5 illustrates an example for the generated frames.

FIG. 5 illustrates an example for the generated frames, whereas each frame is with a different bit rate for each link, and Link 4 is inactive. The statistical traffic data 520 is dynamically fragmented into the active links. The bandwidth (BW) of the statistical traffic is calculated according to the following formula:

Statistical Traffic BW=Sum(Active Links rates)−Overhead−CBR BW.

The overhead is the summary of all active links control block and CRC. The TX framer automatically divides the required CBR data to the active links. Whenever the number of active links is changed by the controller, the CBR data is automatically adjusted to it. For E1/T1 case, timeslots 0 and 16 are multiplied and transmitted over two links for redundancy purposes.

The Statistical Traffic Port uses a gated clock; the framing machine enters the data in bursts when required. The upper level bundling mechanism supports this gated clock and bursts.

The minimal allowed link rate depends on the required CBR BW, and the number of active links. In order to support redundancy, the minimal allowed link rate depends on the required CBR BW, and the number of active links minus one. This allows the framer to exclude high BER link activity without affecting the service (the framing machine will redirect the CBR data automatically when one of the links become inactive, by taking more BW for the CBR data from each of the active links).

Figure 6:
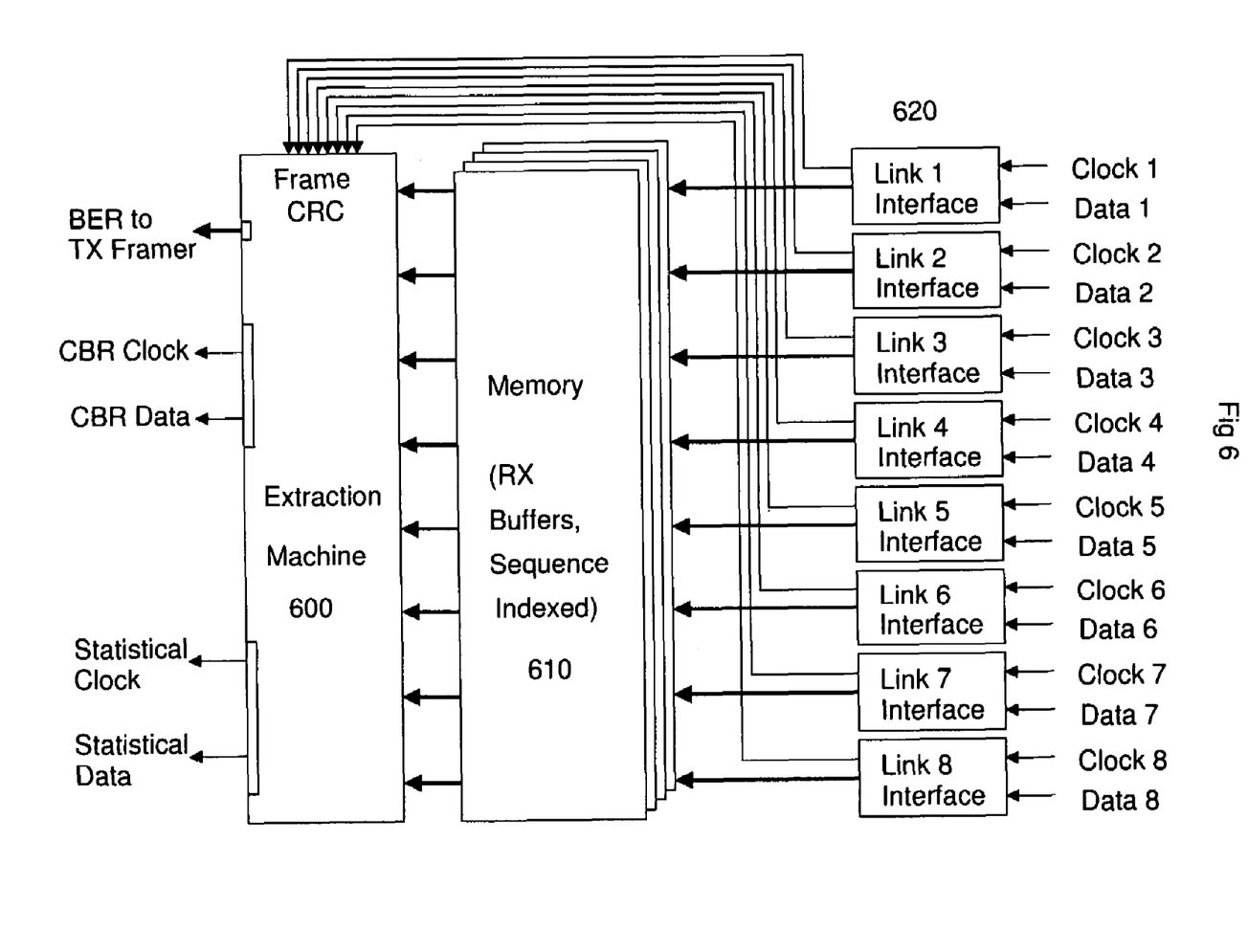
FIG. 6 is a block diagram of the lower level's RX framer in accordance with the present invention.

FIG. 6 is a block diagram of the RX framer. The RX framer also uses a pipeline technique in order to perform "on the fly" dynamic synchronization and reassembly of the fragmented data. The link interfaces 620 are responsible for receiving the frame, detect the frame start/end according to the HDLC FLAG detection, remove the HDLC zero insertion, writing the received frame to the Indexed memory 610 according to the sequence field, and checking and reporting the CRC of the frame to the extraction machine 600.

The extraction machine 600 synchronizes the frames according to the sequence field, and guarantees that the frames from all links are already stored in the memory. This enables propagation delay differences between the links of more then 1 ms.

Figure 7:
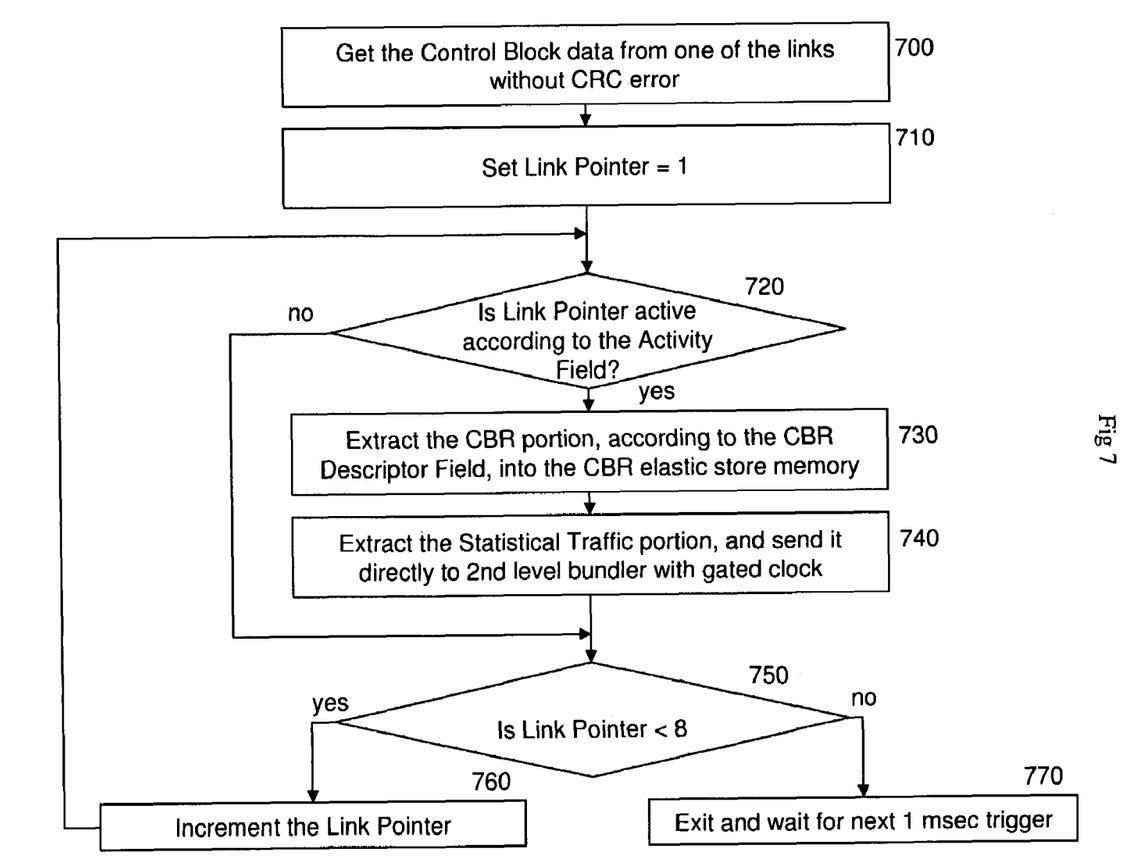
FIG. 7 is a flowchart of the operation of the framing machine of the lower level's RX framer.

The extraction machine 600 reassembles the data, received by the active link interfaces, every 1 ms, according to the following sequence which is described in the flowchart of FIG. 7. First, the Control Block data is retrieved from one of the links without the CRC error (step 700) and the Link Pointer is set to 1 (step 710). Then the extraction machine checks if the link pointed by the link pointer is active according to the activity field (step 720). The CBR portion is extracted, according to the CBR Descriptor Field, into the CBR elastic store memory (step 730) and the Statistical Traffic portion is extracted and sent directly to Upper Level Bundler with gated clock (step 740). Next, if the link pointer is less then 8, it is incremented and the process repeats all steps from step 720, if it is equal to 8 the process stops and waits for next 1 ms trigger. In addition to the sequence described above, the RX Framer also performs the following operations. It continuously checks for sequence synchronization, and in case it detects a synchronization error it performs resynchronization. It extracts time slots 0 and 16 from the primary link if there is no CRC error. If a CRC error is detected on the primary link, time slots 0 and 16 are extracted from the secondary link. The RX Framer also reports the received CRC errors to the TX framer every frame (every 1 ms) and the error free received control block to the Host and it counts the CRC errors (for both directions) and reports it to the Host every 10 ms.

As it is evident from the above description, the RX Framer receives all the information required to reassemble the data from the control block. Since the control block is duplicated and transmitted in parallel over all links, and protected with CRC, it is guaranteed that in each frame the RX Framer will have the exact information about the frame structure. This mechanism enables the TX Framer to change the structure of the frame as needed (due to dynamic services, or due to BER changes in one of the links), without the need to pre synchronize with the RX Framer, and without affecting the traffic.

The BER counters, counting Near End and Far End BER, are reported to the Host every 10 msec. The Host accumulates the BER values, and calculates the absolute value of the BER for each link. According to the calculated Far End BER, the Host controller activates and deactivates the links of the TX Framer. The Host controller detects a high BER condition and deactivates a link within 50 ms. The link is deactivated only for the direction with the high BER condition. The Host controller is only responsible to set the active links of the TX direction. In case of link failure in both directions, the Host Controller at the other side would deactivate the RX direction (its TX direction) in the same manner.

The Upper Level Bundler is responsible for dividing and reassembling the traffic between all available SuperLinks. Its function is relatively simple since it operates on full frames, without having to deal with fragmentation. This enables providing a low cost solution for the scalability feature, which takes advantage of the inherent features of the SuperLink (Lower Level Framer): minimum BW of 2 mbit/s, the transmission time of longest Ethernet frame (1500 bytes) takes about 6 ms; fast BER measurement mechanism for the Near End and Far End, used for independent Lower Level redundancy mechanism; and separation of the CBR traffic from the statistical traffic, with guaranteed BW for the CBR. Because of the very different nature of CBR traffic and Statistical traffic, the Upper Level bundling functions are implemented separately for the CBR and for the Statistical traffic.

The CBR traffic is actually time division multiplexing (TDM) based, and the combiner for that is a simple pulse code modulation (PCM) Matrix. The only issue that requires attention is keeping the frame integrity within the links combining the SuperLink, and between the SuperLinks. This issue is solved by the use of the Sequence Field in the Lower Level Framer, and by synchronizing this field between all SuperLinks.

The Statistical Traffic Bundler prioritizes the frames and adds a short header with priority/port field and frame number prior to the transmission. During the reception, it uses this header to detect missing frames and to guarantee the correct frame order.

As mentioned above, this Upper Level Bundler only deals with SuperLinks with bundled BW of 2 mbit/s or more. The Host Controller is responsible for monitoring the SuperLinks, and to setting the Upper Level Bundler according to the SuperLinks states—it decides whether or not to use every SuperLink.

There are therefore two levels of redundancy: one for a link failure, which is handled by the Lower Level Framer, and one for a SuperLink failure, which is handled by the Upper Level Bundler.

The scalability of this mechanism is achieved due to the low resources required to increase the number of supported SuperLinks. This enables having a low cost Upper Level bundler that can support a large number of SuperLinks, and the higher cost of the Lower Level Framer is paid only when those links are actually used—when stackable SuperLink modules are used.

Figure 8:
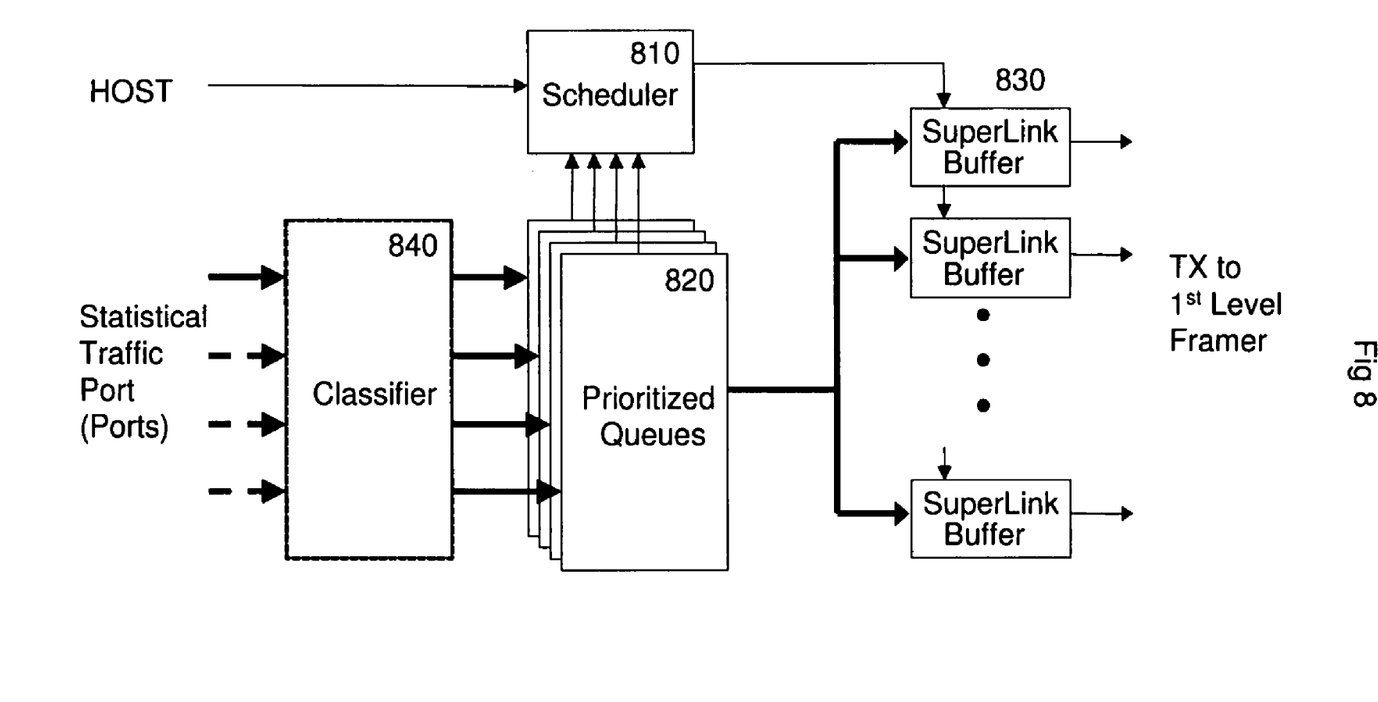
FIG. 8 is a block diagram illustrating the TX function of the upper Level bundler according to the present invention.

FIG. 8 illustrates the TX function of the Upper Level bundler. Since the total bundled BW may be lower then the Statistical Traffic port BW, prioritized queues are used to enable quality of service (QOS) for high priority traffic. The prioritized queues are filled from either prioritized ports, or from a single port with a classification mechanism 840. The scheduler 810 is responsible for allocating frames from the prioritized queues to a free SuperLink buffer 830, according to the priority and according to the HOST setup (active/non-active SuperLinks). The frames are numbered as they are allocated to the SuperLink Buffers 830. This mechanism guarantees the transport and constant delay of the high priority traffic, as long as it's BW is not higher then the bundled BW. In case of congestion, some of the prioritized queues may overflow. In that case, the frames received after the queue is full are discarded.

Figure 9:
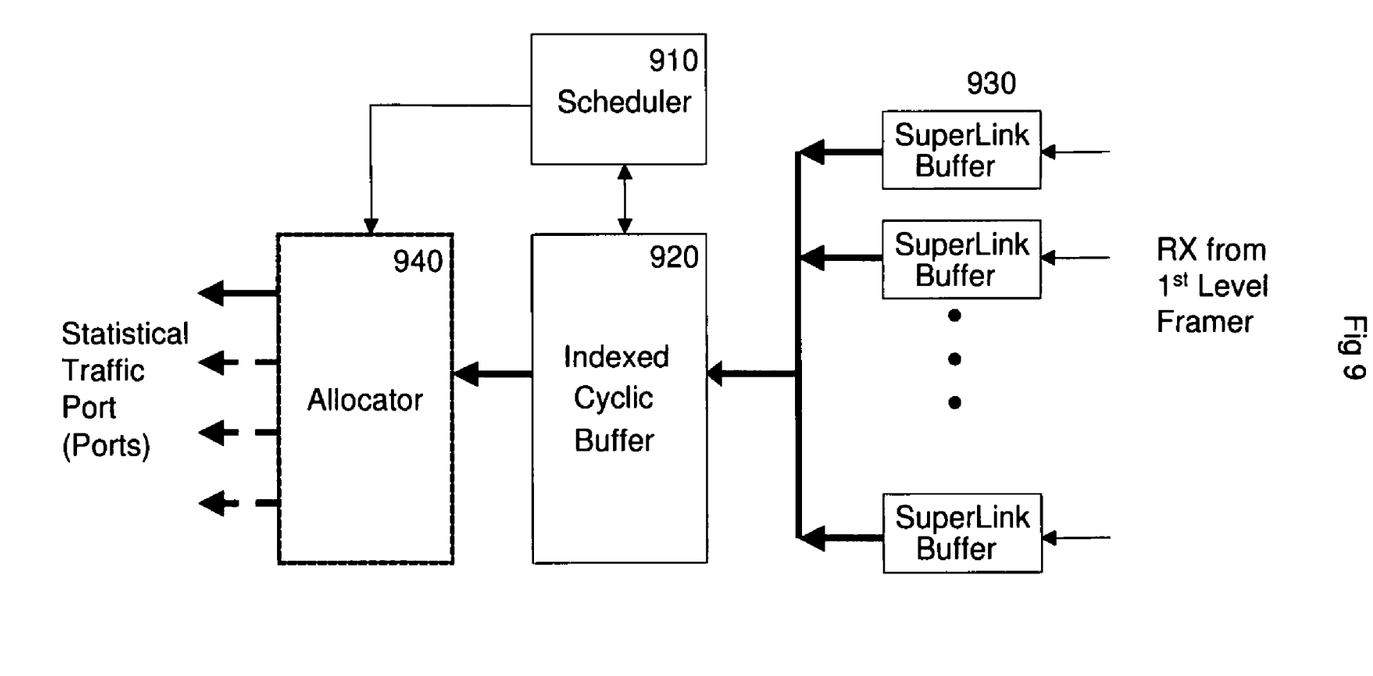
FIG. 9 is a block diagram illustrating the RX function of the upper Level bundler according to the present invention.

FIG. 9 is a block diagram illustrating the RX function of the Upper Level Bundler. The SuperLink Buffers 930 receive the frames, and store it in the Indexed Cyclic Buffer 920, in a location according to the frame number field that was added to the frame by the TX function. The Scheduler 910 moves the frames from the Indexed Cyclic Buffer 920 to the Allocator 940 immediately when stored in the buffer, sequentially according to the frame order. If the current index frame is not received while a predetermined amount of its following frames have already arrived, the scheduler skips the missing frame (discards it) and continue with the next frames.

The Allocator 940 is required only when more then one Statistical Traffic Port is in use. In that case, the allocator 940 uses the Port/Priority field that was added by the TX function, and routes the frame to the required port according to it. While the above description contains many specifications, these should not be construed as limitations on the scope of the invention, but rather as exemplifications of the preferred embodiments. Those skilled in the art will envision other possible variations that are within its scope. Accordingly, the scope of the invention should be determined not by the embodiment illustrated, but by the appended claims and their legal equivalents.

What is claimed is:

1. A communication system simultaneously providing scalable bundling for a plurality of communication links, supporting constant bit rate data and statistical/random data bit rate, said system comprised of:
    an upper transmission bundling level including a constant bit rate bundler and a statistical traffic bundler for allocating bundled data based on received constant bit rate and statistical data;
    a lower transmission bundling level including at least one superlink unit, which receives the allocated bundled data, performing "on the fly" dynamic fragmentation for generating frames to be transmitted through multiple communication links;
    a lower reception bundling level including at least one superlink unit which receives data frames from multiple communication links and reassembles the fragmented data into the bundled data, performing "on the fly" dynamic synchronization;
    a upper reception bundling level including a constant bit rate bundler and a statistical traffic bundler for reassembling the transmitted data from the bundled data.

2. The system of claim 1 wherein each transmission lower level superlink unit includes a framing machine, a memory of transmission buffer and at least eight link interfaces, wherein each link interface measures each communication channel link bit rate.

3. The system of claim 1 wherein each reception lower level superlink unit includes an extraction machine, a memory of reception buffer and at least eight link interfaces.

4. The system of claim 1 wherein the transmission upper level bundler units include a classifier, a queue prioritizer, a scheduler and at least two superlink buffers, wherein the classifier allocates frames from the prioritized queues to the superlink buffers.

5. The system of claim 1 wherein the reception upper level bundler units include an allocator, an indexed cyclic buffer, a scheduler and at least two superlink buffers.

6. The system of claim 1 wherein the generated frames include a control box, a constant bit rate channel Field, a statistical traffic channel, and a cyclic redundancy check, wherein the control box is identical for all communication links of the same superlink.

7. The system of claim 6 wherein the control box includes: a links activity field indicating active links, a sequence field for synchronizing between the frames, a constant bit rate Descriptor Field and a received cyclic redundancy check Status Field.

8. A communication method simultaneously providing scalable bundling for a plurality of communication links supporting constant bit rate data and statistical/random data bit rate, said method comprising the steps of:
    allocating bundled data at an upper communication level based on received constant bit rate and statistical data;
    generating frames from the allocated bundled data at the lower communication level to be transmitted through multiple communication links;
    receiving data frames from multiple communication links and reconstructing the bundled data frames by a lower reception communication level;
    reassembling the transmitted constant bit rate and statistical traffic data from the data bundles by an recention communication level.

9. The method of claim 8 further comprising the step of measuring each communication channel link bit rate and allocating the statistical data between the channel links accordingly.

10. The method of claim 8 further including the step of synchronizing received frames in accordance with sequence field embedded within each frame's control box.

11. The method of claim 1 further comprising the step of managing priority queues for bundled data allocation.

12. The method of claim 8 further comprising the step of allocating statistical data in accordance with priority using a short header with priority/port field and frame number prior to the transmission.

13. The method of claim 8 wherein the generated frames include a control box, a constant bit rate channel Field, a statistical traffic channel, and a cyclic redundancy check, wherein the control box is identical for all communication links of the same superlink.

14. The method of claim 8 wherein the control box includes: a links activity field indicating active links, a sequence field for synchronizing between the frames, a constant bit rate Descriptor Field and a Received cyclic redundancy check Status Field.

* * * * *